United States Patent [19]
Higo et al.

[11] Patent Number: 5,997,751
[45] Date of Patent: Dec. 7, 1999

[54] METHOD AND APPARATUS FOR TREATING AQUEOUS MEDIUM CONTAINING ORGANIC MATTER

[75] Inventors: Tsutomu Higo; Roberto Masahiro Serikawa, both of Kanagawa-ken; Kazuhiro Kondo, Tokyo, all of Japan

[73] Assignee: Ebara Corporation, Japan

[21] Appl. No.: 08/867,824

[22] Filed: Jun. 3, 1997

[30] Foreign Application Priority Data

Jun. 4, 1996 [JP] Japan .................................. 8-162454
May 28, 1997 [JP] Japan .................................. 9-138626

[51] Int. Cl.$^6$ ..................................................... C02F 1/72
[52] U.S. Cl. ........................ 210/758; 210/759; 210/760; 210/761; 210/767; 210/908; 422/188
[58] Field of Search ..................................... 210/758, 759, 210/760, 761, 767, 908, 103, 104; 422/188

[56] References Cited

U.S. PATENT DOCUMENTS

| | | |
|---|---|---|
| 3,591,449 | 7/1971 | Hess et al. . |
| 3,772,181 | 11/1973 | Cole et al. ............................... 210/761 |
| 3,852,192 | 12/1974 | Fassell et al. ........................... 210/761 |
| 4,229,269 | 10/1980 | Buckley et al. . |
| 4,241,722 | 12/1980 | Dickinson . |
| 4,284,015 | 8/1981 | Dickinson . |
| 4,285,140 | 8/1981 | van Raam et al. . |
| 4,292,953 | 10/1981 | Dickinson . |
| 4,377,066 | 3/1983 | Dickinson . |
| 4,380,960 | 4/1983 | Dickinson . |
| 4,593,202 | 6/1986 | Dickinson . |
| 4,714,032 | 12/1987 | Dickinson . |
| 4,898,107 | 2/1990 | Dickinson . |
| 5,000,099 | 3/1991 | Dickinson . |
| 5,050,375 | 9/1991 | Dickinson . |
| 5,250,193 | 10/1993 | Sawicki et al. ......................... 210/761 |
| 5,261,225 | 11/1993 | Dickinson . |
| 5,762,809 | 6/1998 | Luft et al. . |

FOREIGN PATENT DOCUMENTS

| | | |
|---|---|---|
| 0 680 931 | 11/1995 | European Pat. Off. . |
| WO95/14850 | 6/1995 | WIPO . |

OTHER PUBLICATIONS

*Patent Abstracts of Japan*, 16(295) (C–0957), abstract of JP 4–078496 (Mar. 1992).
M. Klosky et al., *Coal Util. Fuel Syst.*, 205–213 (1994).
R. Serikawa et al., *Fuel*, 71, 283–287 (Mar. 1992).
Osaka Gas Co., Ltd., "OG Catalytic Wet Oxidation Process" (Jun. 1985).
S. Lin et al., *J. Environ. Sci. Health*, A29(3), 547–564 (1994).
A. Pasternak et al., "MSW to Hydrogen", U.S. Department of Energy Contract No. W–7405–Eng–48 (Lawrence Livermore National Laboratory).
T. Minowa et al., *J. Chem. Engineering of Japan*, 28(6), 727–731 (1995).
J. Kimoto et al., *Aromatics*, 36(7) and (8), 161–172 (1994).
T. Minowa et al., *Biomass and Bioenergy*, 8(2), 117–120 (1995).

*Primary Examiner*—David A. Simmons
*Assistant Examiner*—Betsey J. Morrison
*Attorney, Agent, or Firm*—Wenderoth, Lind & Ponack, L.L.P.

[57] ABSTRACT

A hydrothermal reaction is performed on an aqueous medium without adding an oxidizing agent, and then another hydrothermal reaction is performed in the presence of an oxidizing agent, thereby reducing a chemical oxygen demand of the aqueous medium. An apparatus for performing a hydrothermal reaction has a fluid inlet being capable of introducing an oxidizing agent in a fluid form during a hydrothermal reaction.

12 Claims, 7 Drawing Sheets

METHOD AND APPARATUS FOR TREATING AQUEOUS MEDIUM CONTAINING ORGANIC MATTER

BACKGROUND OF THE INVENTION

The present invention relates to a method and an apparatus for treating an aqueous medium containing an organic matter. The present invention more particularly relates to a method for preparing a starting slurry from an organic waste in solid, sludge, or liquid form, such as municipal waste, night soil, sewage sludge, industrial wastes and so on; and subjecting the starting slurry to two stages of hydrothermal reactions.

Conversion of waste into fuel or a carbon source has been receiving attention. Wastes such as municipal waste, night soil, sewage sludge, industrial wastes and so on have a tendency to contain an organic matter, and thus it is desired to convert the organic matter into an energy source and a carbon source for so-called C1 chemistry in a form easy to handle. It is further desired that the energy source has a high calorific value.

A hydrothermal reaction has been investigated as a prospective method for converting an organic matter in waste into a valuable resource. Specifically the method includes the steps of: preparing a starting slurry containing water from waste, which may further include the steps of pulverizing waste and then classifying the pulverized waste; performing a hydrothermal reaction onto the starting slurry to give a carbon slurry; and then removing water as well as organic components dissolved therein from the carbon slurry.

FIG. 3 shows a flow diagram of a conventional method having a hydrothermal reaction. First, the waste is converted into a starting slurry. When the waste contains a solid matter, the solid matter is pulverized to give a plurality of solid particles having a diameter up to several millimeters. In the pulverizing step, inorganic solid matter, such as glass, tiles, pebbles, and metal are removed as much as possible. On the other hand when the waste is a sludge, a waste liquid and so on which do not require the pulverization, the waste is, if necessary, passed through screen so as to remove large a solid matter having a dimension larger than about 10 millimeters.

Preferably, the pulverizing step and the classifying step may be carried out in a liquid medium, such as a water medium, having the solid matter dispersed therein so as to facilitate obtaining a starting slurry. Alternatively, the pulverizing step may be carried out in air, and then the pulverized waste may be mixed with a liquid containing water to give a starting slurry. Preferably, the starting slurry has a water content and a fluidity such that the starting slurry can be transferred by means of a pump. The starting slurry typically has a medium containing water and substances dissolved in water and a plurality of combustible particles dispersed in the medium, and the starting slurry has a high viscosity.

Then the starting slurry is subject to a hydrothermal reaction in the absence of the external oxidizing agent to give a carbon slurry. The hydrothermal reaction refers to a reaction in the presence of water at high temperatures under high pressures. In the hydrothermal reaction, for example, the starting slurry may be pressurized to a pressure of not less than 150 atmospheric pressures, and the slurry was heated to temperatures of 250° C. to 350° C. while retaining the pressure for one to two hours. In a continuous treatment, an inside of a reaction vessel may be heated in advance, and the starting slurry may be pressurized to be fed into the reaction vessel so that the starting slurry at high temperatures under high pressures is allowed to remain in the reaction vessel for a prescribed period. In contrast, in a batch treatment or a semi-continuous treatment comprising a plurality of batch treatments, the starting slurry is charged into a reaction vessel which can withstand internal pressures, the reaction vessel is enclosed, and the temperatures thereof are increased so as to increase pressures inside the reaction vessel increases accordingly.

In the hydrothermal reaction, a variety of organic matter present in the starting slurry decomposes. For example, a dissolved oxygen gas and oxygen atoms in the organic matter oxidize the organic matter to give carbon dioxide. A small amount of a reductive gas such as ammonia, hydrogen sulfide, mercaptan and so on may be produced. Moreover, a salt in the waste may be transferred to an aqueous phase. Furthermore, a halogen atom such as a chlorine atom, a bromine atom, etc., contained in the organic matter may be eliminated therefrom so as to form a salt containing the halogen atom, thereby transferring the salt to an aqueous phase.

A carbon slurry refers to a mixture of water, a solid matter, and an oily matter. The solid matter, which may be referred to as a char and the oily matter may be produced by dehalogenation and decarbonation of at least a part of the organic matter. The oily matter herein refers to those which can be extracted by an organic solvent such as hexane, dichlorobenzene and so on. Therefore, the oily matter contains those solidified at room temperature, such as tar and pitch, and an organic compound soluble in water. An aqueous phase refers to a filtrate obtained by extracting the carbon slurry, which contains water, by the organic solvent; and filtering the remaining aqueous layer. A solid phase refers to a solid matter or a cake obtained by filtering the remaining aqueous layer.

After the hydrothermal reaction, a flush operation, indirect heat exchange and so on are carried out so as to reduce the pressures to an atmospheric pressure, to cool the carbon slurry and to degas.

The solid matter and the oily matter obtained are substantially free of a halogen atom, have a low water content, have a relatively high calorific value, and are allowed to be easily pulverized.

When the starting slurry has a plurality of combustible particles therein, the hydrothermal reaction gives a plurality of solid particles in the resulting carbon slurry, and the solid particles are fragile char, which has an improved carbon content. The decomposition reaction in associated with the hydrothermal reaction decreases a viscosity of the slurry, and therefore facilitates removal of the aqueous phase from the carbon slurry. The removal of the aqueous phase allows the solid particles to serve as fuel for, for example, a boiler having a fluidized bed. Alternatively, the isolated carbon particles may be pulverized in oil or water to obtain a concentrated carbon slurry, which serves as fuel. This slurry is a pseudo liquid in the sense that it has fluidity, and the form of the slurry is convenient in storage and transportation thereof. The concept is somewhat similar to coal oil mixture (COM) and coal water mixture (CWM), which have developed in view of the utilization of coal. For example, a concentrated carbon slurry having a calorific value of 3000 to 5000 kcal/kg may be obtained.

A cake obtained by filtering the carbon slurry itself may serve as fuel for a boiler having a fluidized bed; and the cake may be fed into a furnace thereof. The cake tends to be in a nodular form due to its moisture, and the cake is fed into a fluidized bed without being flown away by a gas generated in the furnace. The cake is mixed with a fluidized medium having temperatures of 600 to 850° C., dried, collapsed, and caught fire to burn, thereby improving fuel efficiency. A so-called return ash process, which comprises the step of feeding into the fluidized bed again precipitated ash in a bottom of the boiler and collected dust ash in a flue bottom, further improves the fuel efficiency.

When the organic matter present in the starting slurry contains a halogen atom, the hydrothermal reaction to form a carbon slurry and subsequent removal of the aqueous phase from the carbon slurry substantially removes the halogen atom. On the other hand, the carbon slurry containing the halogen atom is disadvantageous as fuel. When such carbon slurry is used as fuel, the halogen atom in the carbon slurry corrodes a metal which comes into contact with an exhaust gas, melts the ash to give a scale or clinker and vaporize a heavy metal. Moreover, when such carbon slurry is used as fuel for firing cement, the resultant cement has improved salt concentrations. Therefore, the removal of halogen atoms from the carbon slurry decreases metal corrosion, prevents the formation of the scale and clinker, and enables its application as fuel for firing cement. The halogen atom includes fluorine atom, chlorine atom, bromine atom, and iodide atom. The chlorine atom, which tends to be present significantly more than the other halogen atoms, is particularly problematic for example when the waste is municipal waste and when the waste contains a chlorine-containing polymer, such as polyvinyl chloride, polyvinylidene chloride and so on.

After removing the aqueous phase from the carbon slurry, the resulting residue may be washed with water for further removing salts containing halogen atoms, and, if desired, water in the residue may be removed to give the solid matter and the oily matter. As an apparatus for removing the aqueous phase and washing the residue, a centrifugal dehydrator having a bucket may be preferably used so as to efficiently perform the dewatering step, the washing step and the dewatering step of the cleaning water.

However, the aqueous phase removed from the carbon slurry contains a high concentration of organic matter, and the concentration thereof typically corresponds to a range of 20,000 to 100,000 PPM of chemical oxygen demand. Such organic matter includes, for example, alcohol, ketone, amine etc. Typically a water containing an organic matter undergoes a biological treatment. However, the aqueous phase containing this level of organic matter cannot be subject to the biological treatment. Usually, the aqueous phase needs to be diluted by a large quantity of water prior to the biological treatment. Alternatively, the aqueous phase is required to be vaporized and oxidized by fuel oil.

Therefore, it is an object of the present invention to provide a method for decreasing the chemical oxygen demand of the aqueous phase from the carbon slurry to such a level to allow biological treatment. Moreover, it Is another object of the present invention to provide a method for treating not limited to the aqueous phase from the carbon slurry but an aqueous medium In general containing an organic matter so as to decrease the chemical oxygen demand thereof.

SUMMARY OF THE INVENTION

One aspect of the present invention provides a method for hydrothermally treating an aqueous medium containing an organic matter, comprising the steps of: pretreating the aqueous medium without adding an oxidizing agent at a first temperature ranging from 200° C. to 374° C. under a pressure of not less than a vapor pressure of the aqueous medium at the first temperature; and treating the aqueous medium with an oxidizing agent in an amount sufficient for decreasing a chemical oxygen demand of the aqueous medium at a second temperature ranging from 200° C. to 374° C. under a pressure of not less than a vapor pressure of the aqueous medium at the second temperature.

Another aspect of the present invention provides an apparatus for performing a hydrothermal reaction comprising: a reaction vessel withstanding a high internal pressure required for a hydrothermal reaction; a heater for heating the reaction vessel; a liquid inlet for introducing an aqueous medium into the reaction vessel; a liquid outlet for discharging an aqueous medium from the reaction vessel; and a fluid inlet being capable of introducing an oxidizing agent in a fluid form during a hydrothermal reaction.

BRIEF DESCRIPTION OF THE DRAWINGS

The features and advantages of the present invention will be better understood by the following detailed description of preferred embodiments of the invention, which considered in connection with the accompanying drawings, in which.

DETAILED DESCRIPTION OF THE INVENTION

Figure 1:
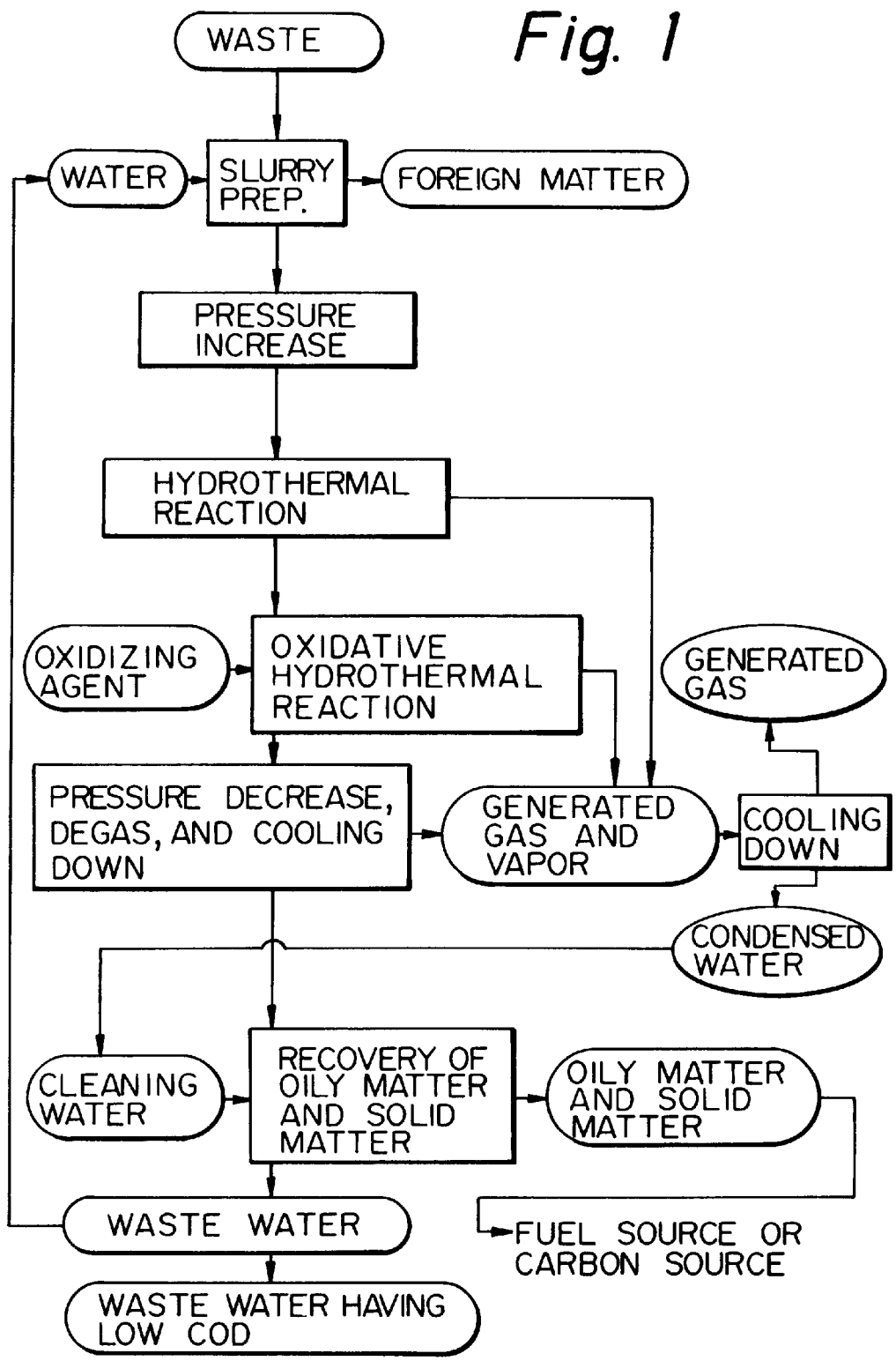
FIG. 1 is a flow diagram of one embodiment in accordance with the present invention.

According to the one aspect of the present invention, a hydrothermal reaction is carried out without adding an oxidizing agent (the first step), and then another hydrothermal reaction is carried out in the presence of the oxidizing agent (the second step). In both of the hydrothermal reactions, the aqueous medium is kept at temperatures under pressures such that the aqueous medium remains in subcritical conditions. In other words, the aqueous medium is kept at temperatures less than 374° C. since water has the critical temperature of 374° C. At temperatures higher than the critical temperature, the vapor phase cannot be differentiated from the liquid phase. Moreover, under critical conditions, any salt in general cannot be dissolved in fluid any more, oily matter dissolves in water, and a viscosity decreases such that a slurry cannot be maintained any longer.

During the first step, temperatures are kept in a range from 200° C. to 374° C., preferably in a range from 200° C. to 350° C., and further preferably in a range from 200° C. to 300° C. As temperatures during the first step decrease, more products that are insoluble in water are formed, thereby making it suitable to utilize the insolubles as fuel and carbon source. However, temperatures below 200° C. decrease the reaction rate, and are thus unfavorable.

On the other hand, during the second step, temperatures are kept in a range from 200° C. to 374° C. Temperatures during the second step are preferably higher than, further preferably higher by 30° C. than, and still further preferably higher by 50° C. than the temperatures during the first step since the higher temperatures give the faster reaction rate in oxidizing the organic matter dissolved in water. Temperatures during the second step are preferably kept in a range from 250° C. to 374° C., and further preferably kept in a range from 300° C. to 374° C.

In both of the hydrothermal reactions, the aqueous medium is kept under a pressure of not less than the vapor pressure at the temperatures so as to keep the aqueous medium in the liquid phase. The "vapor pressure" refers to a pressure of a vapor phase that is in equilibrium with a liquid phase or a solid phase at a certain temperature. In the present invention, the vapor pressure of water at high temperatures under high pressures become an issue, and thus the vapor pressure of water mainly refers to a vapor pressure in equilibrium with liquid. The vapor pressure of water depends on components dissolved in water, and in general the vapor pressure of an aqueous medium containing an organic matter and a dissolved salt differs from the vapor pressure of pure water at the same temperature.

In both of the hydrothermal reactions, the pressures preferably range from the vapor pressure to 50 atmospheric pressures more than the vapor pressure. When the pressure is higher than the vapor pressure by more than 50 atmospheric pressures, it would require the reaction vessel which withstands an excess pressure, and thus unfavorable. The pressures during both of the hydrothermal reactions further preferably range from the vapor pressure to 10 atmospheric pressures more than the vapor pressure, and further still preferably range from the vapor pressure to 5 atmospheric pressures more than the vapor pressure since pressure fluctuations inside the reaction vessel during the operation tend to be less than 5 atmospheric pressures. Incidentally, it would be preferable to open a safety valve when the internal pressure exceeds the aforementioned upper limit.

When one or both of the hydrothermal reaction is carried out in a continuous treatment, it would be preferable to first increase the pressure to a desired level and then increase the temperatures to a desired level. On the other hand, when the hydrothermal reaction is carried out in a batch treatment or a semi-continuous treatment comprising a plurality of batches, the aqueous medium is preferably charged into the reaction vessel, then the reaction vessel is enclosed, and subsequently the reaction vessel is heated so as to increase the internal pressures due to the increased vapor pressure.

Figure 6:
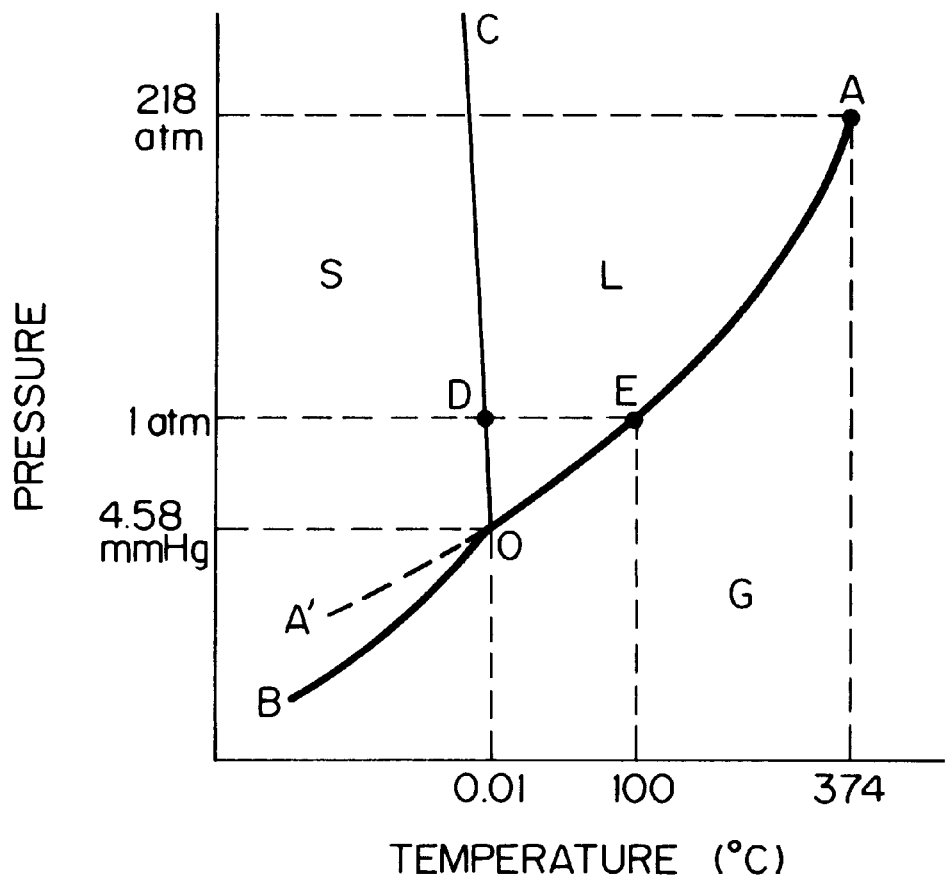
FIG. 6 is a phase diagram of pure water.

FIG. 6 shows a phase diagram of pure water. Curve OA refers to a vapor pressure curve, which shows vapor pressures of water depending on temperatures. Curve OA shows the relationship between pressures and boiling points of the liquid also; when the liquid is heated at a constant temperature, upon reaching at a point on curve OA, the liquid starts to boil.

Curve OA terminates at the critical point A. The temperature, pressure, and molar volume are called the critical temperature, critical pressure, and critical volume, respectively. Any of the critical temperature, critical pressure, and critical volume is called a critical constant, which is a constant value inherent in each substance. Please note that a molar volume of a gas is equal to a molar volume of a liquid at the critical point.

Under conditions consisting of temperatures higher than the critical temperature and of pressures higher than the critical pressure, a fluid forms wherein a gas cannot be differentiated from a liquid. The fluid is called a supercritical fluid. For example, pure water has the critical temperature of 374° C. and the critical pressure of 218 atmospheric pressures. When a gas is compressed at temperatures lower than the critical temperature, upon reaching a point on the vapor pressure curve, the gas is drastically liquefied. In contrast, when a gas is compressed at temperatures higher than the critical temperature, discontinuous change between a gas and a liquid does not occur.

In the first step of the initial hydrothermal reaction according to the present invention, an "aqueous medium containing an organic matter" is treated. The "aqueous medium" is meant to any medium containing water, and include, for example, a suspension, an emulsion, and an aqueous solution. The aqueous medium may further contain an organic compound in a liquid form. The "organic matter" of the "aqueous medium containing an organic matter" may be liquid or solid. Therefore, the "aqueous medium containing an organic matter" includes a suspension having unprecipitated, combustible, solid particles dispersed in water, an emulsion having combustible, liquid particles dispersed in water, an aqueous solution having liquid organic matter dissolved in water, and mixtures thereof. The "aqueous medium containing an organic matter" further includes a starting slurry and a carbon slurry, both of which have a continuous phase containing water, a liquid organic matter, and a salt dissolved therein and a dispersed phase containing combustible particles, which may be solid. Both of the slurries may further contain solids such as tar, pitch and so on and uncombustible solid such as ash and so on.

In the second step according to the present invention, the aqueous medium obtained by the initial hydrothermal reaction is subject to another hydrothermal reaction in the presence of an oxidizing agent so as to oxidize the organic matter present in the aqueous medium, thereby decreasing the chemical oxygen demand of the aqueous medium. As a result, it facilitates treatment of polluted water, especially after separation of solid particles therefrom has been effected.

When the aqueous medium is free of the oxidizing agent during the hydrothermal reaction, a gas containing carbon dioxide, hydrogen sulfide, mercaptan, ammonia and so on forms. In contrast, when the oxidizing agent is present during the hydrothermal reaction, carbon dioxide forms more, hydrogen sulfide, mercaptan and ammonia form less, concentrations of sulfate ion ($SO_4^{2-}$) and nitrate ion ($NO_3^-$) in the aqueous phase increase, compared to those in the absence of the additional oxidizing agent.

Preferably, the oxidizing agent is substantially free of a heavy metal such as chromium, manganese, and so on since the heavy metal contaminates a resulting waste water and environmentally unfriendly.

Preferably the oxidizing agent may include an oxygen gas, an ozone gas and hydrogen peroxide, and further preferably an oxygen gas. A gas containing an oxygen gas such as air may be used as the oxidizing agent. For example, a pressurized air may be directly introduced into a reaction vessel so as to introduce an oxygen gas.

Alternatively, a liquid such as water having an oxygen gas dissolved therein may be used. An oxidizing agent in a gas form such as an oxygen gas and an air has increased solubility in water as temperatures decrease and as pressures increase. Therefore, the oxidizing agent in a gas form may be dissolved in a cold water under high pressures, and then the cold water obtained may be added to the slurry.

In the second hydrothermal reaction according to the present invention, an oxidizing agent is used in an amount sufficient for decreasing a chemical oxygen demand of the aqueous medium. The chemical oxygen demand measures an oxygen equivalent of an organic matter in a sample. For example, a sample of the aqueous medium is refluxed with a known amount of potassium dichromate in sulfuric acid. Prior to the reflux, silver sulfate is added to the sample so as to oxidize a straight-chain compound, and mercury sulfide is added to the sample so as to prevent the oxidation of chloride ion. To the unreacted potassium dichromate is titrated iron ammonium sulfate so as to determine the chemical oxygen demand of the aqueous medium.

An amount of the oxidizing agent preferably ranges from 0.1 to 10 equivalents of the chemical oxygen demand of the aqueous medium to be treated. The oxidizing agent in an amount of less than 0.1 equivalent cannot sufficiently decrease the chemical oxygen demand. In contrast, the oxidizing agent in an amount of more than 10 equivalents leads to a large amount of the unreacted oxidizing agent, which is not required. Therefore, in order to decrease the chemical oxygen demand of the aqueous medium, an amount of the oxidizing agent is preferably less than 10 equivalents, further preferably less than 5 equivalents, and further sill preferably less than 2 equivalents.

In the present invention, after the initial hydrothermal reaction without the oxidizing agent but before the subsequent hydrothermal reaction with the oxidizing agent, combustible, solid particles may be removed from the aqueous medium. Alternatively, the aqueous medium obtained by the initial hydrothermal reaction may be directly subject to the subsequent hydrothermal reaction without the removal of the combustible, solid particle, and after the subsequent hydrothermal reaction, then the combustible, solid particles may be removed from the aqueous medium. In either case, the combustible, solid particles obtained may be used as fuel source or a carbon source.

In the latter case, it is desired not to oxidize all the combustibles that can be removed from the aqueous medium such as the combustible solid particles during the subsequent hydrothermal reaction with the oxidizing agent. In other words, preferably an organic matter being dissolved in water such as lower alcohol, lower carboxylic acid and so on are oxidized whereas combustible, solid particles remain unoxidized or are little oxidized. In view of the foregoing, an amount of the oxidizing agent preferably ranges up to 1 equivalent, further preferably up to 0.8 equivalents, and still further preferably up to 0.5 equivalents of the chemical oxygen demand of the aqueous medium. Therefore, an amount of the oxidizing agent preferably ranges from 0.2 to 0.8 equivalents and further preferably from 0.3 to 0.5 equivalents of the chemical oxygen demand of the aqueous medium.

On the other hand, in the former case where the combustible, solid particles are removed from the aqueous medium prior to the subsequent hydrothermal reaction with the oxidizing agent, all of the organic matter present in the aqueous medium may be oxidized. Therefore, an amount of the oxidizing agent preferably ranges not less than 0.8 equivalents, further preferably not less than 1 equivalent, and still further preferably not less than 2 equivalents of the chemical oxygen demand of the aqueous medium. In this case, after the initial hydrothermal reaction, typically, the aqueous medium may be cooled to temperatures lower than 100° C. so as to solidify and remove the solid matter and the oily matter, which may be suitable as fuel or carbon source.

EXAMPLES

Figure 4:
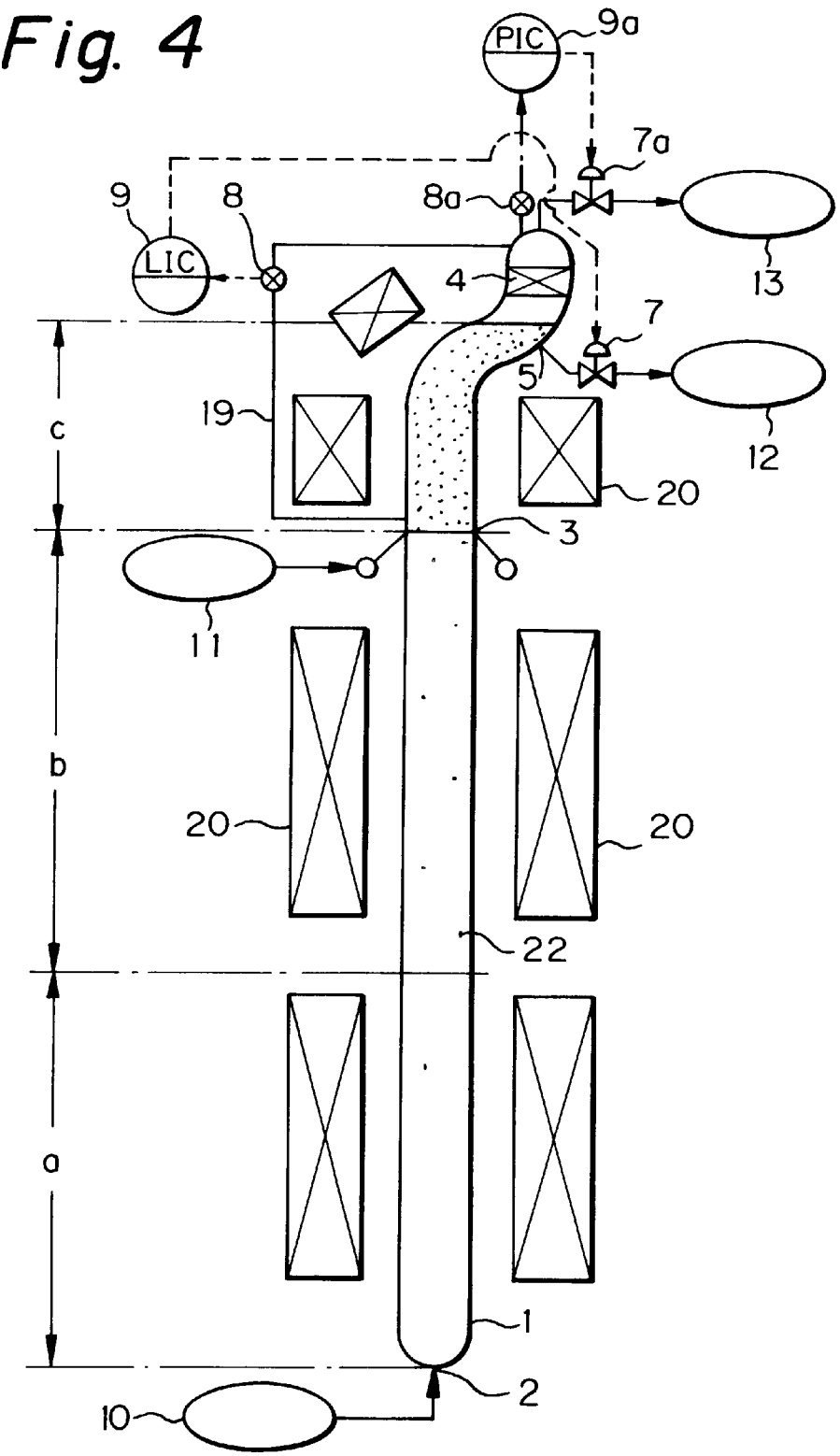
FIG. 4 shows an apparatus for continuously carrying out two hydrothermal reactions.

FIG. 4 shows an apparatus for performing a hydrothermal reaction in accordance with the another aspect of the present invention. A reaction vessel 1 has a generally cylindrical shape in a substantially normal direction, and a top portion has a shape similar to a letter "S". A height of the reaction vessel 1 in a longitudinal direction may preferably be at least 5 times and further preferably at least 10 times as much as a dimension of the reaction vessel 1 in a transverse direction. The reaction vessel 1 may preferably have a height of at least 150 m and further preferably have a height of at least 200 m since it is easier to achieve required internal pressures with such a vessel with little assistance from a high pressure pump.

Around the reaction vessel 1 may be provided a heater 20 for heating a slurry inside the vessel 1. There is no limit in a mechanism for the heater 20, and the mechanism may include electromagnetic induction, radiation heat, a jacket having a fluid in high temperatures therein, and so on. If the reaction heat due to the oxidation reaction is capable of keeping the slurry at sufficiently high temperatures in region (c) which is located downstream from an addition point of the oxidizing agent, the heater corresponding to region (c) may be omitted.

The reaction vessel 1 has a liquid inlet 2, being disposed in a bottom thereof, for introducing a slurry, a gas outlet 6, being disposed in a top thereof, for discharging a gas, and a fluid inlet 3 for introducing a pressurized air by means of a header. The fluid inlet 3 is disposed in an upper middle section of the reaction vessel 1. Beneath a gas outlet 6 is provided a gas-liquid separator 4 for separating liquid such as a slurry spray and liquid droplets.

A level mechanism for adjusting a level of an aqueous medium in the reaction vessel within a prescribed range may have a level detector for detecting a pressure difference between a gas and an aqueous medium, a liquid valve for discharging an aqueous medium, and a controller for controlling the valve in response to a signal from the level detector. The level of the aqueous medium may preferably be adjusted such that the aqueous medium does not come into contact with the gas-liquid separator and that the level is located above the liquid outlet 5. Alternatively, the level of the aqueous medium may be adjusted in a narrower range. The level mechanism may have a connecting tube 19 or a piezoelectric element for converting a pressure to an electrical signal.

In FIG. 4, a connecting tube 19 connects a space above the gas-liquid separator 4 and an area below the slurry level. The connecting tube 19 has a level detector 8 for determining a gas-liquid interface or a slurry level. The level detector 8 may measure the slurry level by a pressure difference between a gas and the slurry so as to determine an amount of the discharged carbon slurry 12 such that the slurry level remain constant or within a prescribed range. For example, the level detector 8 may convert the pressure difference, which may be transmitted as the air pressure to control the liquid valve to regulate the amount of the discharged carbon slurry. Alternatively, the apparatus may have a pair of piezoelectric elements for converting a pressure to an electric signal, which are disposed in a position contacting the open space above the gas-liquid separator 4 and another position contacting the slurry, respectively, and the pair of electric signals from the piezoelectric elements may be input to the level detector for detecting the pressure difference.

As shown in FIG. 4, the slurry level is preferably set in an area being adjacent to the S shaped curve in the reaction vessel 1 so as to increase a surface area of the slurry level so as to facilitate the separation of a gas from the carbon slurry, thereby reducing a gas remained therein.

A pressure mechanism for adjusting an internal pressure of the reaction vessel within a prescribed range may have a pressure detector for detecting a pressure of the gas phase, a gas valve for discharging a gas, and a controller for controlling the gas valve in response to a signal from the pressure detector. The pressure mechanism may adjust a pressure in a range, for example, such that the pressure is sufficiently high to keep the aqueous medium in the liquid phase and that the pressure is sufficiently low to safely operate the reaction vessel. The pressure detector may have a piezoelectric element for converting a pressure into an electrical signal.

In FIG. 4, the apparatus has a liquid outlet 5 for discharging a carbon slurry, being disposed in the S-shaped area of the reaction vessel 1 beneath the gas-liquid interface. At a pipe from the liquid outlet 5 is provided an open-close valve 7. Based on the detected value obtained by the level detector 8, the controller 9 controls the open-close valve 7 so as to adjust an amount of the carbon slurry discharged such that the slurry level remains constant or within a prescribed range. It would be preferable to adjust frequency of opening and closing operations of the open-close valve 7 rather than to adjust the degree of opening in the open-close valve. The latter case is not favorable since the slurry passing through the open-close valve 7 in high velocity may wear the valve and since a small degree of the opening may clog the open-close valve.

The apparatus has a gas outlet 6, being disposed above the gas-liquid separator 4, for discharging an exhaust gas. A pressure detector 8a is provided adjacent to the gas outlet 6. At a pipe from the gas outlet 6 is provided a control valve 7a. The controller 9a controls the control valve 7a so as to adjust an amount of the discharged gas from the control valve 7a such that the pressure detected by the pressure detector 8a remains constant or within a prescribed range since the hydrothermal reactions produce a gas such as carbon dioxide and so on. When air is used as an oxidizing agent, a nitrogen gas and so on are introduced along with an oxygen gas, necessitating the discharge of an excess gas.

A starting slurry 10 which has been prepared in advance is introduced into the reaction vessel 1 by means of a pump for pressurizing the slurry, and the slurry rises inside the reaction vessel 1 from region (a) to region (b) to region (c). The heater 20 heats the reaction vessel 1, and temperatures of the slurry increase as the slurry rises in region (a). On the other hand, the temperature of the slurry is substantially constant in region (b). An oxidizing agent such as oxygen gas and so on is not present both in regions (a) and (b), and the hydrothermal reaction, which accompany dehalogenation, reduction, and so on is carried out in region (b). The hydrothermal reaction may be carried out in a part of region (a) adjacent to region (b). The hydrothermal reaction decompose the organic matter present in the slurry, producing bubbles 22.

Since a pressurized gas is introduced into the reaction vessel 1 through a fluid inlet 3 and since the reaction vessel is kept under high pressures, an oxygen gas dissolved in the slurry is present in region (c). The slurry risen to region (c) is subject to the hydrothermal reaction in the presence of the dissolved oxygen gas serving as the oxidizing agent.

The slurry is discharged from the liquid outlet 5, being disposed under the gas-liquid interface. A gas is released from the gas-liquid interface or the slurry level, and the gas-liquid separator 4 separates a slurry spray and liquid droplets from the gas, and the resulting exhaust gas 13 is discharged from the gas outlet 6 by means of the control valve 7a.

In another embodiment of the present invention, the reaction vessel may have a configuration of letter "U", and one of the top has a slurry inlet while the other top has a slurry outlet. In this embodiment, a slurry is introduced into the reaction vessel through the slurry inlet at one of the top thereof, and the slurry goes down from the top to the bottom, and then to the bottom to the other side of the top so as to be discharged from the slurry outlet thereat. In this case, the reaction vessel preferably has a height not less than 1000 m and further preferably not less than 1500 m since high pressures are achieved by the weight of the slurry itself without the pressured pump. The oxidizing agent may be introduced at the bottom of the reaction vessel.

In either embodiment, preferably the shape of the reaction vessel and the flow direction of the slurry are arranged such that the end side of the reaction is arranged at the highest part of the reaction vessel.

Now the present invention will be described in accordance with FIG. 1.

In FIG. 1, when the waste is mainly consists of large solid matter, the solid matter is pulverized, and inorganic solid matter, such as glass, tiles, pebbles, and metal are removed as much as possible. Consequently, the waste is converted into a slurry having water, which has fluidity. On the other hand when the waste does not require the pulverization such as the waste is substantially free of the solid matter, for example, a sludge, a waste liquid and so on, the waste is, if necessary, passed through a screen so as to remove a solid matter, thereby giving a slurry. Then, if desired, the slurry may be diluted so as to adjust a concentration thereof such that the slurry has fluidity. Caution should be made not to overdilute the slurry since a higher concentration reduces an amount of slurry required for the hydrothermal reaction, and is favorable.

As described in Japanese patent application No. 132568/1998, the starting slurry may be treated by methanotroph prior to the hydrothermal reaction so as to decrease the methane concentration therein. The entire disclosure of Japanese patent application No. 132568/1998 is incorporated herein as reference.

The starting slurry is subject to the hydrothermal reactions at high temperatures under high pressures. Typically, the temperatures range from 200° C. to 350° C., and the pressures are higher than the vapor pressure of the temperature.

The reaction time depends on temperatures; the higher the temperatures are, the shorter the reaction time is. Generally, the reaction time may range from 10 min. to 1 to 2 hours. Typically, the reaction time may correspond to a period that the slurry stays in the reaction vessel, and the reaction time may be calculated by the volume of the reaction vessel and the rate of introducing the slurry thereinto.

The elimination reactions of halogen atoms and oxygen from the compound present in the slurry may be significantly carried out at temperatures not less than 250° C. In the hydrothermal reaction, oxygen atom participating in chemical bond may be reacted to give carbon dioxide. Halogen atoms participating in chemical bond may be eliminated and transferred to an aqueous phase. Moreover, a small amount of reductive gas may be formed.

In FIG. 1, after carrying out the hydrothermal reaction being substantially free of a prescribed amount of the oxidizing agent, another hydrothermal reaction is carried out. FIG. 4 shows an apparatus being adapted to carrying out the two hydrothermal reactions. The hydrothermal reaction in the presence of the oxidizing agent preferably has higher temperatures, for example, 300 to 374° C. than the hydrothermal reaction in the absence of the hydrothermal reaction.

When fuel is obtained from the carbon slurry, an excess amount of the oxidizing agent is not preferable since it would decrease yield. Therefore, after the hydrothermal reaction, a gas separated from the slurry may contain an malodor gas such as ammonia, hydrogen sulfide and so on. In this case, the malodor may be removed by combustion thereof or by adsorption of activated charcoal.

After the hydrothermal reactions, the carbon slurry obtained is subject to pressure reduction, cooling down and degassing, all of which can be achieved by flush operation. The flush operation refers to discharging a slurry into a container having a larger volume so as to drastically decrease the pressure. Immediately after the operation, the slurry temperature remains constant. On the other hand, the boiling point depends on the pressure, and the temperatures of the slurry immediately after the operation may be higher than the boiling point. As a result, water in the slurry evaporates so as to deprive the heat of vaporization, cooling down the slurry. Moreover, the water vaporization may release gas dissolved in the slurry, achieving degassing. The flush operation may be carried out in a multiple stage by an apparatus having a plurality of tanks and valves. It is preferable to utilize the heat of the gas obtained, which may contain water vapor.

Subsequently, the carbon slurry is dewatered, and the solid matter and the solidified oily matter is washed by cleaning water so as to remove salts containing halogen atoms and being soluble to water, thereby giving the solid matter. Condensed water obtained by degassing and cooling down may be used as the cleaning water. The solid matter thus obtained from the municipal waste may typically have a calorific value of 3000 to 5000 kcal/kg. The reason that the solid matter obtained by a method according to the present invention have such high calorific value may result from the fact that the solid matter has little water content and few oxygen and halogen atoms.

The waste water from which the solid matter and the oily matter have been removed has decreased chemical oxygen demand by 10 to 30 percent (which may depend of the type of the waste), compared to those obtained by a method having hydrothermal reaction without adding air. Therefore, the waste water can be subject to a biological treatment.

Figure 2A:
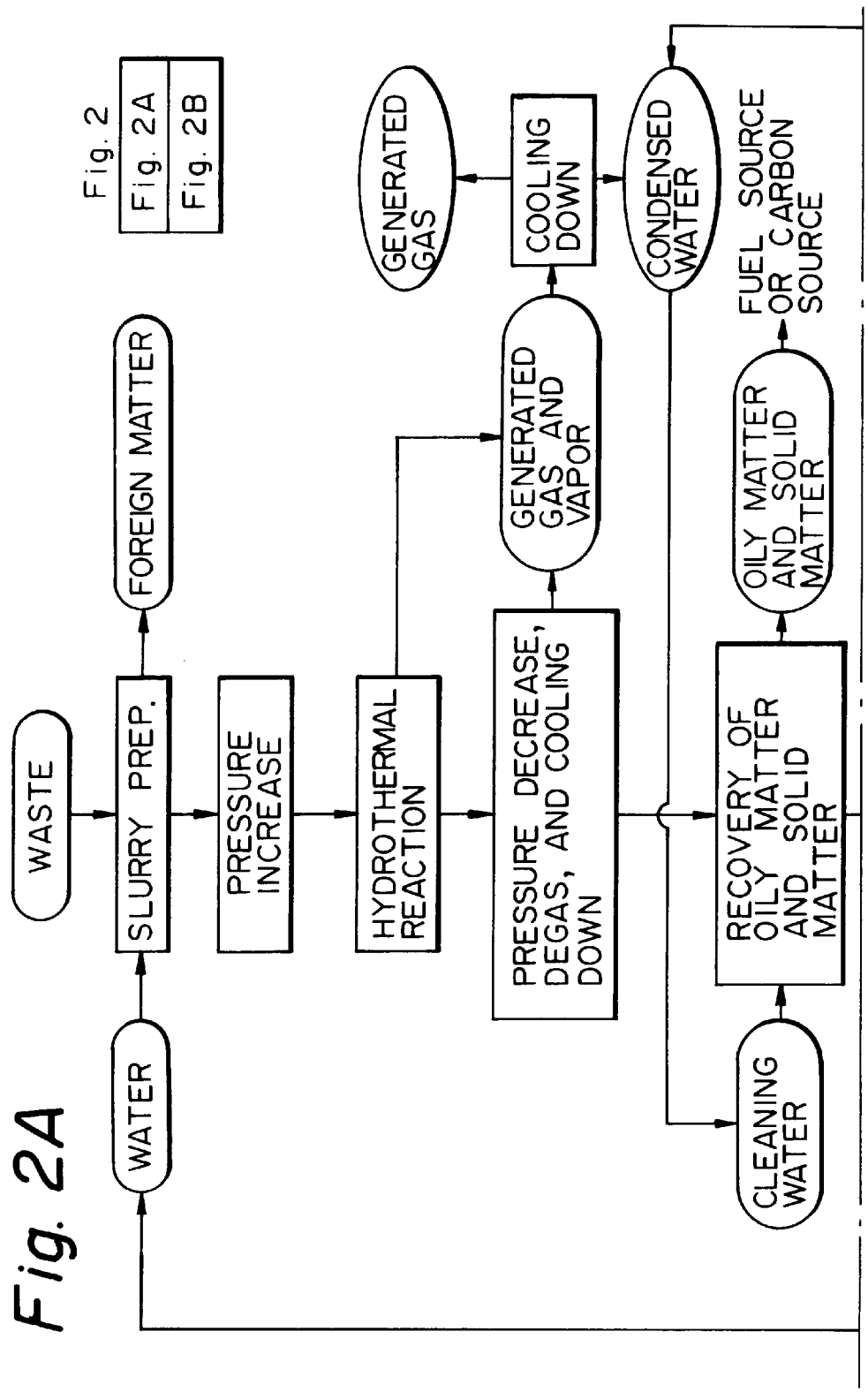
FIG. 2 is a flow diagram of another embodiment in accordance with the present invention.
Figure 2B:
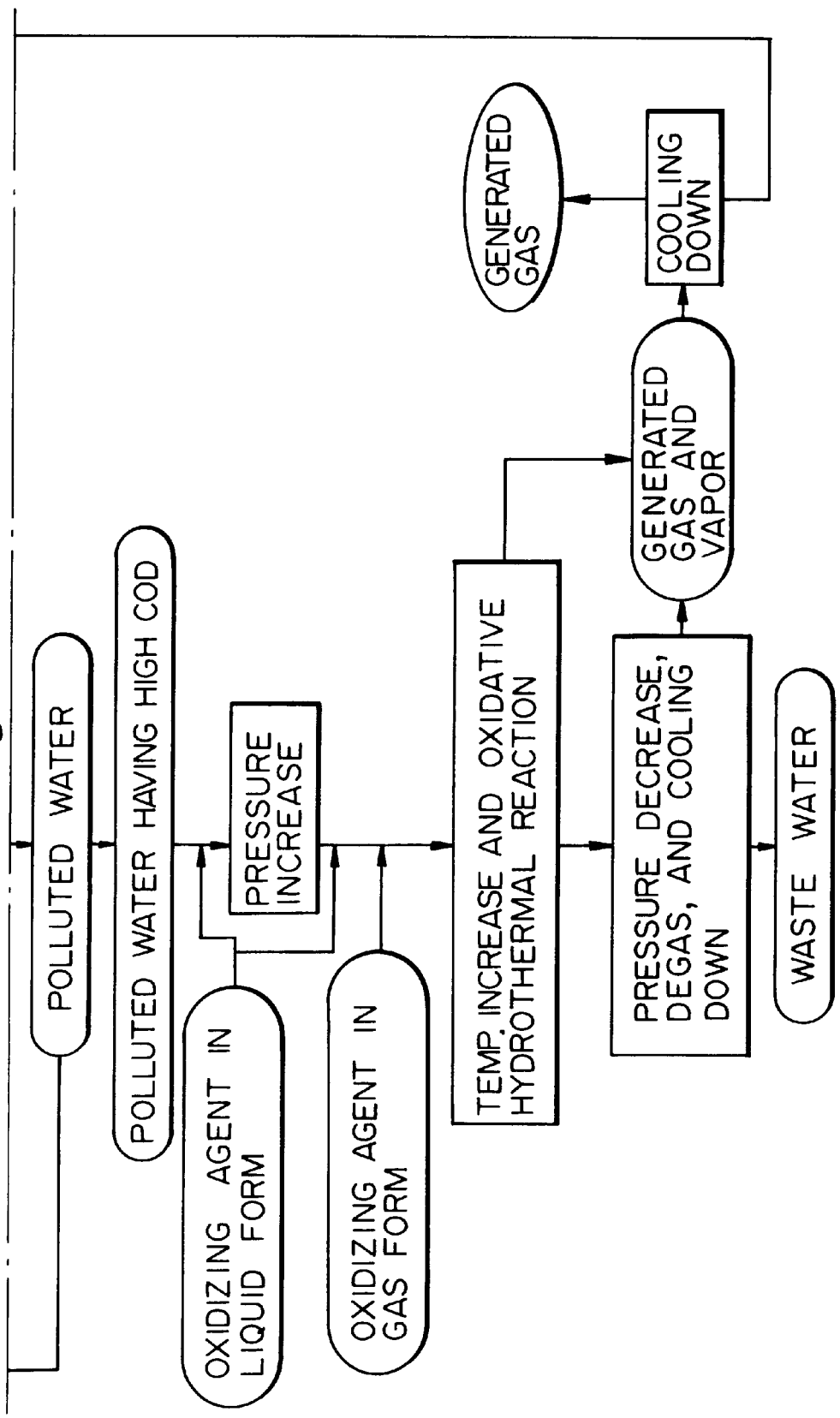
Figure 3:
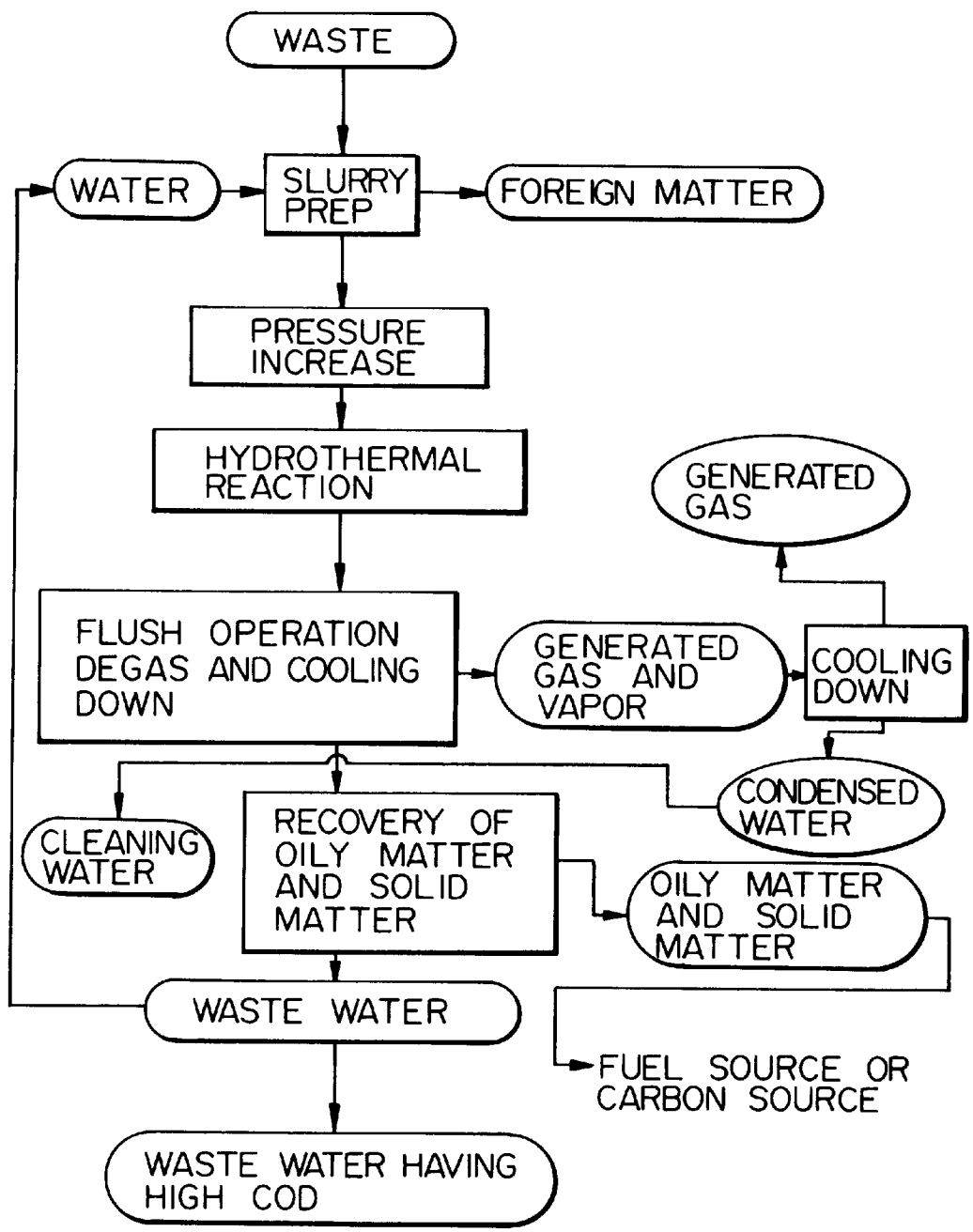
FIG. 3 is a flow diagram of a conventional method.

In FIG. 2, the starting slurry is subject to the hydrothermal reaction in the absence of the oxidizing agent at temperatures ranging from 200° C. to 374° C. under pressures more than vapor pressures to give a carbon slurry having high chemical oxygen demand, and the solid matter and the oily matter are removed from the carbon slurry to give a polluted water. Subsequently, the polluted water is further subject to hydrothermal reaction in the presence of the oxidizing agent. The polluted water has a lower viscosity compared to the starting slurry. Since the polluted water is further is subject to another hydrothermal reaction, the resulting treated water has a much lower viscosity, thereby facilitating the gas-liquid separation in the upper portion.

In the embodiment of FIG. 2, the polluted water is not used as fuel, and a sufficient amount of the oxidizing agent can be added. Therefore, the treated water after the hydrothermal reactions and the flush operations have a sufficiently low chemical oxygen demand as to allow its release. Moreover, the exhaust gas in the upper part of the reaction vessel becomes a mixture of carbon dioxide, water vapor and unreacted oxygen gas and so on, and it may prevent a malodor gas such as ammonia, hydrogen sulfide and so on from generating. In other words, an exhaust gas can be released into air.

Figure 5:
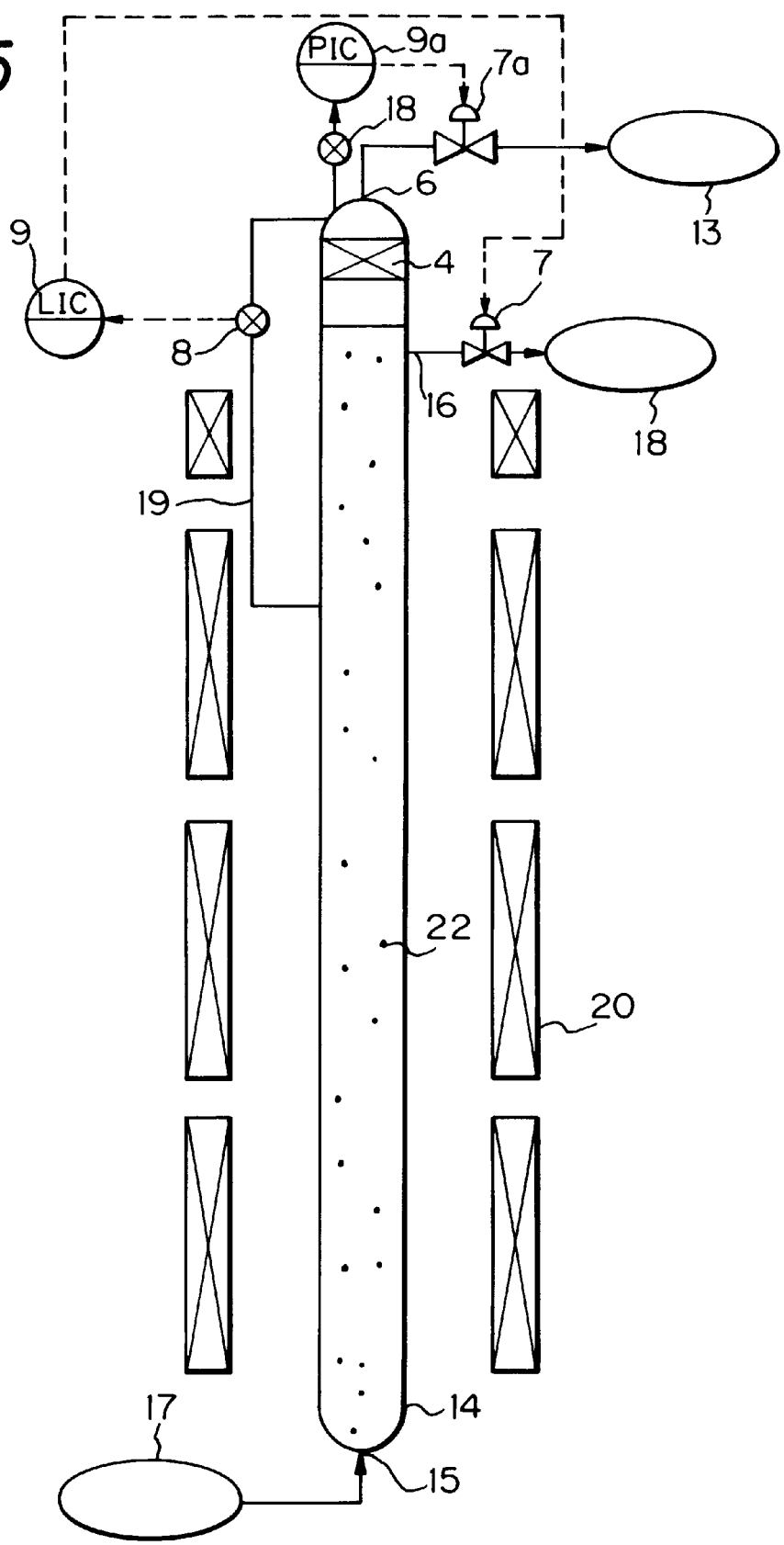
FIG. 5 shows an apparatus for carrying out oxidative hydrothermal reaction onto a polluted water.

FIG. 5 shows an apparatus for carrying out a hydrothermal reaction in the presence of an oxidizing agent onto a solution from which the solid matter and the oily matter are removed. The initial hydrothermal reaction can be carried out, for example, by the apparatus of FIG. 4 without adding the oxidizing agent.

In FIG. 5, the reaction vessel 14 has a cylindrical shape. In contrast to the apparatus of FIG. 4, the curvature is not formed in the reaction vessel 14 since the solution to be treated has a lower viscosity and gas-liquid separation is easier.

In FIG. 5, the apparatus has a heater 20 around the reaction vessel 14. To a solution 17 obtained by carrying out a hydrothermal reaction in another vessel and removing the solid matter is added an oxidizing agent, and the resulting solution 17 is introduced into the reaction vessel through the liquid port 15. The solution 17 introduced rises inside the reaction vessel 14, and discharged from the liquid outlet 16 provided in the upper part of the reaction vessel 14. The solution 17 undergoes oxidation during the step of rising inside the reaction vessel 14.

At the top of the reactor 14 is provided a gas outlet 6 for discharging an exhaust gas, and below the gas outlet 6 is provided a gas-liquid separator 4 for separating a slurry spray and liquid droplets.

The apparatus has a connecting tube 19 between the upper space of the gas-liquid separator and the position under the solution level, and the connecting tube 19 has a level detector 8 for determining gas-liquid interface or a solution level. The level detector 8 measure a solution level by the pressure difference between the gas and the solution, and an amount of the discharged waste water 18 is determined such that the solution level remains constant or in a prescribed range.

A pipe from the liquid outlet 16 for discharging the waste water has a control valve 7. Based on the detected value obtained by the level detector 8, the controller 9 controls the control valve 7 so as to adjust an amount of the waste water such that the solution level remains constant or within a prescribed range. In this embodiment, the solution has a lower viscosity after the hydrothermal reaction, and thus it is more difficult to occur the wear and the plugging of the control valve, compared to the slurry. As a result, a control valve such as a ceramic valve may be used.

It is not necessary to add an oxidizing agent after increasing the pressure. For example, when the oxidizing agent in a liquid form has a slow reaction rate at low temperatures such as hydrogen peroxide, it is preferable to add the oxidizing agent and then increase the pressure. When the oxidizing agent decomposes and generates a gas immediately after adding the oxidizing agent to the solution, the oxidizing agent can be added after increasing the pressure so as to reduce the generation of the gas and to further reduce the volume of the gas generated.

The present invention can decrease a chemical oxygen demand of an aqueous medium. For example, the present invention can reduce the chemical oxygen demand of polluted water obtained by removing solid matter from a carbon slurry to a level to allow biological treatment.

What is claimed is:

1. A method for hydrothermally treating an aqueous medium containing organic matter, comprising the steps of:
   a. subjecting the aqueous medium without adding an oxidizing agent at a first temperature ranging from 200° C. to 374° C. to a pressure of not less than a vapor pressure of the aqueous medium at the first temperature; and then b. subjecting the aqueous medium with an oxidizing agent in an amount sufficient for decreasing a chemical oxygen demand of the aqueous medium at a second temperature ranging from 200° C. to 374° C. to a pressure of not less than a vapor pressure of the aqueous medium at the second temperature, steps a. and b. being performed in the same reaction vessel.

2. The method of claim 1 wherein the aqueous medium to be pretreated comprises a slurry having a combustible particle dispersed in water.

3. A method of claim 1 wherein the aqueous medium obtained by the pretreating step includes a solid matter, and the method further comprises the step of removing the solid matter from the aqueous medium to give an aqueous solution, and the aqueous solution is subject to the treating step.

4. The method of claim 1 wherein an amount of the oxidizing agent ranges from 0.1 to 10 equivalents of the chemical oxygen demand of the aqueous medium to be treated.

5. The method of claim 1 wherein the oxidizing agent comprises at least one species selected from the group consisting of an oxygen gas, an ozone gas and hydrogen peroxide.

6. The method of claim 1 further comprising a step of introducing a pressurized air into a reactor containing the aqueous medium prior to the treating step so that an oxygen gas in the pressured air serves as the oxidizing agent.

7. The method of claim 1 wherein the oxidizing agent comprises an oxygen gas dissolved in water.

8. The method of claim 1 wherein the second temperature is higher than the first temperature.

9. The method of claim 1 wherein the aqueous medium is treated with the oxidizing agent at the second temperature ranging from 250° C. to 370° C.

10. The method of claim 1 wherein the aqueous medium is treated with the oxidizing agent at the second temperature ranging from 300° C. to 374° C.

11. The method according to claim 1, wherein the hydrothermal treatment is performed in an apparatus comprising:

a reaction vessel withstanding a high internal pressure required for a hydrothermal reaction;

a heater for heating the reaction vessel;

a liquid inlet for introducing an aqueous medium into the reaction vessel;

a liquid outlet for discharging an aqueous medium from the reaction vessel;

a fluid inlet being capable of introducing an oxidizing agent in a fluid form during a hydrothermal reaction;

a level mechanism for adjusting a level of an aqueous medium in the reaction vessel within a prescribed range; and a pressure mechanism for adjusting a pressure inside the reaction vessel within a prescribed range.

12. The method according to claim 11, wherein the level mechanism comprises a level detector for detecting a level of an aqueous medium, and the pressure mechanism comprises a pressure detector for detecting a pressure inside the reaction vessel.

* * * * *